Figures 1, 2:
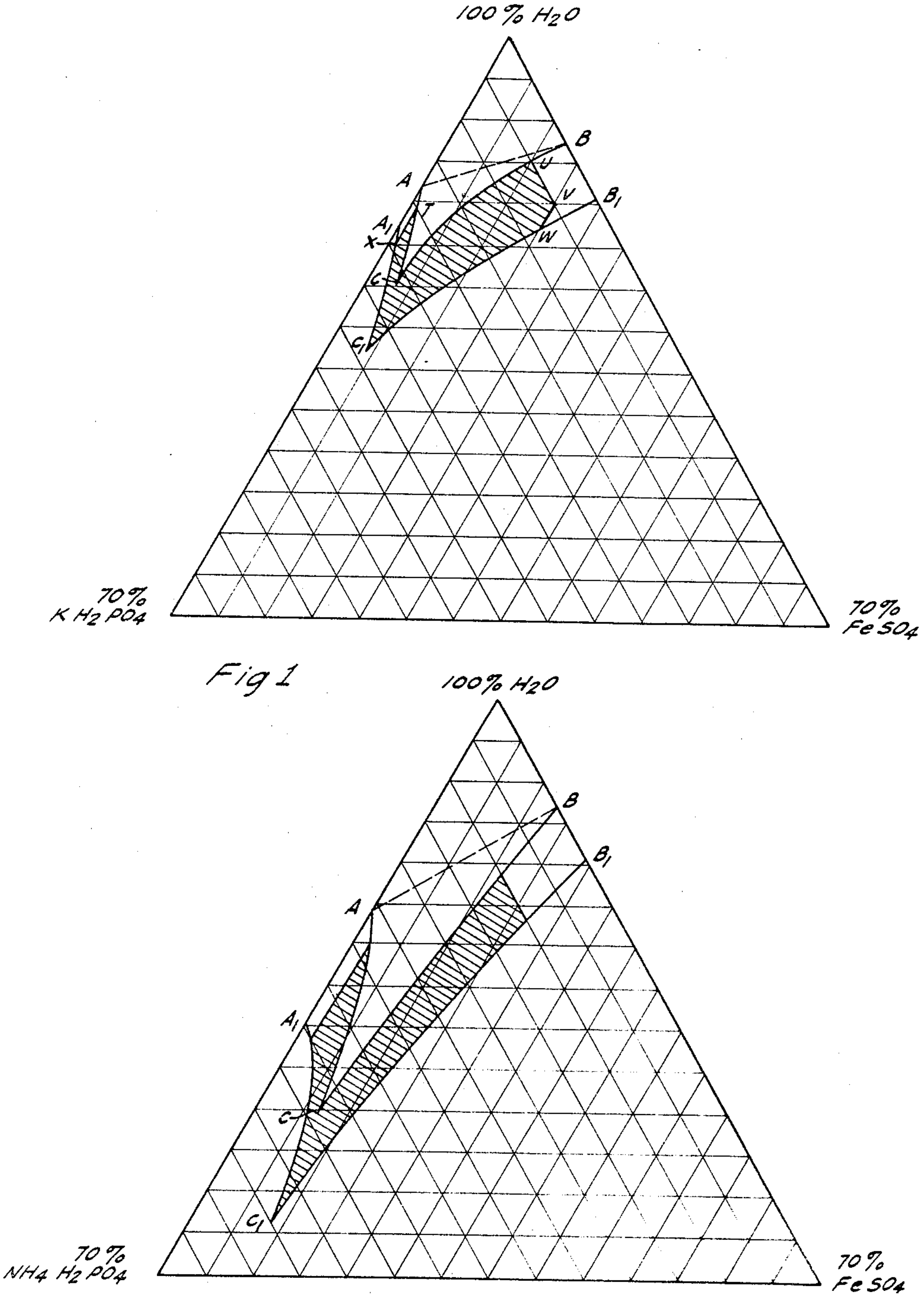

United States Patent

Backlund

[15] 3,663,197

[45] May 16, 1972

[54] INCREASED COMPONENT CONCENTRATION OF IRON NUTRIENT SOLUTION

[72] Inventor: Peter Stanley Backlund, Anaheim, Calif.

[73] Assignee: Union Oil Company of California, Los Angeles, Calif.

[22] Filed: Nov. 12, 1969

[21] Appl. No.: 875,739

[52] U.S. Cl. ....................71/34, 23/107, 71/1, 71/64 C, 71/63

[51] Int. Cl. ....................C05b 7/00

[58] Field of Search ....................71/1, 34, 63, 64 C

[56] References Cited

UNITED STATES PATENTS

| | | | |
|---|---|---|---|
| 2,270,518 | 1/1942 | Ellis et al. | 71/64 C X |
| 2,950,183 | 8/1960 | Nikitin et al. | 71/1 X |

OTHER PUBLICATIONS

Liquid Fertilizer Manual, 1967– Chapter 5, page 2; & Chapter 17, page 1– published by National Fertilizer Solutions Association, Peoria, Ill.

*Primary Examiner*—Reuben Friedman
*Assistant Examiner*—Bennett H. Levenson
*Attorney*—Milton W. Lee, Richard C. Hartman, Lannas S. Henderson, Dean Sandford, Robert E. Strauss and M. Dale Nelson

[57] ABSTRACT

A solution suitable for application to plants and soil to correct iron deficiencies is described which comprises an aqueous solution of ferrous sulfate and mono-potassium or mono-ammonium hydrogen orthophosphate having an acidic pH value from about 1.5 to about 4, and wherein the components of the solution manifest a mutually increased solubility.

6 Claims, 2 Drawing Figures

INVENTOR.
PETER STANLEY BACKLUND
BY
Robert E. Shaw
ATTORNEY

INCREASED COMPONENT CONCENTRATION OF IRON NUTRIENT SOLUTION

DESCRIPTION OF THE INVENTION

This invention relates to nutrient solutions and in particular relates to iron-containing nutrient solutions suitable for correction of iron deficiency in crops and soils.

One of the commonly encountered trace metal deficiencies in crops or soils is an iron deficiency. While various solutions have been described for the preparation of iron-containing solutions for correcting such deficiencies, heretofore, no solution has been described which supplies a mixture of nutrients comprising phosphorus in major quantities with lesser quantities of nitrogen, potassium, or mixtures thereof.

While the iron-containing solutions of this invention can be used to correct iron deficiencies at any time, it has been found that the solutions are of particular value in late season application, i.e., 20 to about 45 days prior to harvesting. It has been found that the application of these solutions, particularly those in which phosphorus is present in major proportions, results in greatly enhanced late season growth, particularly when potassium or nitrogen are also present. Accordingly, this invention is directed to such iron-containing compositions and a method for their preparation.

I have found that ammonium or potassium dihydrogen orthophosphate, or mixtures thereof, in admixture with ferrous sulfate in aqueous solution, from eutectic compositions having greatly enhanced solubilities of the solids. This enhanced solubility greatly increases the amount of the phosphate, e.g., approximately doubles the solubility of the phosphate in the aqueous solution for any given salting out temperature. This enhanced solubility of a major nutrient in an iron-containing nutrient solution is significant in that it permits the application of the major nutrient, i.e., phosphorus in substantial quantities to the plant simultaneously with the application of the iron to correct iron deficiency.

The solutions of this invention will be described by reference to the FIGURES of which:

FIG. 1 is a ternary diagram of the system of mono-potassium orthophosphate, water and ferrous sulfate; and FIG. 2 is a ternary diagram for the system of mono-ammonium hydrogen orthophosphate, water and ferrous sulfate.

Referring to FIG. 1, it can be seen that the ferrous sulfate and mono-potassium hydrogen orthophosphate form eutectic compositions having greatly enhanced solubilities. The system depicted in FIG. 1 represents the system at a pH value of 2; however, this system is substantially identical to the systems having pH values in the range from about 1.5 to about 4 which are encompassed within this invention. As illustrated, the maximum solubility of mono-potassium hydrogen orthophosphate in water at 0° Centigrade is illustrated by point A as comprising about 18.5 weight percent of the solids. At 20° C. there is a slight increase in solubility to 23 weight percent solute as illustrated by point $A_1$. Similarly, the maximum solubility of ferrous sulfate in an aqueous solution at 0° C. is approximately 13 weight percent solute as illustrated by point B while at 20° C. is approximately 18 weight percent solute as illustrated by point $B_1$. The broken line A–B connecting the points A and B of the 0° isotherm represents the normally expected solubilities of these salts upon simple admixture of the solutions A and B. Thus, it would be expected, absent any synergistic effect on solubility exhibited by the combination, that the solubilities of the mixtures of the salts would fall along the straight line A–B. Contrary to this expectation, I have found that the combination of salts exhibits a synergistic effect on solubility and mixtures of the solutions A and B will dissolve further quantities of solutes so that the isotherm is substantially depressed, particularly for solutions containing about 2 to 4 weight percent ferrous sulfate where, at point C, it can be seen that the total solute content of the solution is about 30 weight percent, considerably in excess of the solubilities of either of the individual components in the water. A similar effect can be illustrated at the 20° C. isotherm as represented by points $A_1$, $B_1$ and $C_1$ wherein a solution containing up to 38 weight percent solute is possible without exceeding the 20° C. salting out temperature.

Solutions falling within the scope of this invention therefore comprise those solutions having salting out temperatures no greater than 0° C. and comprising an aqueous solution of ferrous sulfate and mono-potassium hydrogen orthophosphate with a pH value from about 1.5 to about 4 and the composition included within the area defined by lines A–B, B–C and C–A of FIG. 1. Other solutions embraced within the scope of this invention comprise those solutions having from 1 to about 15 weight percent ferrous sulfate, from 5 to about 34 weight percent mono-potassium hydrogen orthophosphate and from 62 to about 85 weight percent water, in an amount sufficient to provide a salting out temperature of the solution from 0° to about 20° C. These compositions are encompassed within the shaded area defined by lines T–C, C–U, U–V, V–W and W–$C_1$ and $C_1$–X appearing on FIG. 1. Of the solutions within the scope of the invention, the most preferred are those containing from about 2 to 10 weight percent ferrous sulfate with a consequentially high content of mono-potassium orthophosphate.

Referring now to FIG. 2, the ternary system for the mono-ammonium orthophosphate, ferrous sulfate and water can be seen. This system, as that previously described, exhibits a eutectic point in solubility, i.e., the solutes exhibit synergistic solubilities. Thus the mono-ammonium orthophosphate has a maximum solubility in an aqueous solution at a pH from about 1.5 to 4 of about 26 weight percent at 0° C. and, at 20° C., approximately 40 weight percent. These points are shown as A and $A_1$ of FIG. 2. As with the previously described system, the solutions encompassed by my invention comprise those solutions contained within the area defined by the lines A–B, B–$B_1$, $B_1$–$C_1$, $C_1$–$A_1$ and $A_1$–A. It is these solutions which exhibit an unexpectedly low salting out temperature for any given solute concentration which is lower than the expected salting out temperature if the solutes simply combine additively.

Particularly preferred solutions are those having from 1 to 16 weight percent ferrous sulfate,from 10 to 55 weight percent mono-ammonium orthophosphate and from 36 to about 78 weight percent water. These solutions are shown in the shaded area of FIG. 2. Of these solutions and of the solutions within the area A–B–C–A, the most preferred compositions are those having from about 2 to 10 weight percent ferrous sulfate with consequentially high contents of mono-ammonium orthophosphate.

Although not separately shown, similar ternary systems occur when the ammonium or potassium dihydrogen orthophosphate solute is replaced with a mixture of both these solutes. Such systems, while being quaternary systems, can be depicted on a ternary diagram at any constant ratio of the ammonium to the potassium salt and have solubilities intermediate the two extremes shown in FIGS. 1 and 2.

The aforementioned solutions are employed with an acidic pH, i.e., a pH from 1.5 to about 4.0, preferably from 2 to 3. The dihydrogen orthophosphate solutes have a slightly acid pH when dissolved in an aqueous solution. Their pH, however, is lowered to the aforementioned values by the incorporation in the solution of a minor amount of a mineral acid such as sulfuric acid, phosphoric acid, nitric acid, or a hydrohalic acid, e.g.,hydrochloric, hydrobromic, hydroiodic or hydrofluoric. Of the aforementioned acids, sulfuric and phosphoric are preferred. The amount of the mineral acid which is added to the solutions to lower the pH to the desired value can be from about 0.05 to about 5.0 weight percent, preferably from about 0.1 to about 2 weight percent.

The preferred use of the aforementioned solutions comprises the foliar application of the solutions to crops late in the growing season, e.g., at a period within about 20 to 45 days prior to the harvesting. The solutions can be applied in undiluted concentration or, if desired, can be admixed with from 0.1 to about 10 gallons of water per gallon of the aforementioned solution. The solutions are applied at a dosage sufficient to provide from about 0.01 to about 0.5 pound iron per acre, preferably from about 0.1 to about 0.2 pound iron per acre. In alternative applications, the solutions can be applied at the aforementioned dosages directly to the soil and can be applied at any time prior to or during the growing season of the particular crop. In such uses the solutions can be applied to correct known or suspected deficiencies of iron in the soil before an iron deficiency appears in the crop or can be applied to the soil whenever the iron deficiency becomes apparent by an abnormal appearance of the crop.

The aforementioned solutions are compatible with most nutrient solutions and can be blended therewith in any desired proportion. Thus the aforementioned solutions can be blended with from about 1 to about 25 gallons per gallon of the solution of various nutrient solutions such as aqueous solutions of ammonium nitrate, urea, mixtures thereof, urea formaldehyde solutions, ammonium phosphate solutions, etc. The aqueous solutions can also be mixed with various suspensions of supersaturated solutions of the aforementioned nutrient solutes or suspensions of various fertilizer solids such as triple superphosphate, superphosphate, acidulated and pulverized phosphate rock, etc.

It has been observed that the iron-containing solutions can develop a slight cloudiness upon standing. This is caused by the slow formation of ferric orthophosphate which is insoluble in the aqueous solutions. The ferric orthophosphate is formed by a slow oxidation of the ferrous ions to ferric ions by dissolved oxygen. This tendency does not provide any major problem in the use of the solutions because only a minor amount of precipitation occurs and the precipitate which is formed is flocculant and only imparts cloudiness to the solutions.

I have found that even this slight precipitation can be prevented by incorporating, in the solution, a soluble reducing agent that has an oxidation potential more negative than iron in the solution. The presence of from 0.1 to about 1.0, preferably from about 0.2 to 0.5 weight percent of such a reducing agent maintains the clarity of the solutions for prolonged storage periods.

Examples of suitable reducing agents are the low molecular weight ($C_1$–$C_5$) alkanals, e.g., formaldehyde, acetaldehyde, propionaldehyde, butyraldehyde, valeraldehyde, etc. Reducing sugars, e.g., those capable of reducing Fehling's solution, can also be used. Examples of these are: monosaccharides such as glucose, mannose, galactose, fructose or sorbose; disaccharides such as melibose, maltose, revertose, celloboise, lactose or gentioboise; or trisaccharides such as rhamninose. Another group of suitable reducing agents are the various polyhydroxybenzenes such as hydroquinone, pyrogallol, 1,3,5-trihydroxybenzene, 1,2,4,5-tetrahydroxybenzene, hexahydroxybenzene, etc.

The following will illustrate various compositions encompassed within the invention:

TABLE

| | | Concentration, weight percent | | | | | | | |
|---|---|---|---|---|---|---|---|---|---|
| Solution | Reducing agent | $FeSO_4$ | $KH_2PO_4$ | $NH_4H_2PO_4$ | $H_2O$ | $NH_4NO_3$ | 8-24-0 | $(NH_4)_2SO_4$ | Urea |
| 1 | | 5 | 15 | | 80 | | | | |
| 2 | | 12 | 15 | | 73 | | | | |
| 3 | 0.3 mannose | 3 | 27 | | 69.7 | | | | |
| 4 | | 4 | 35 | | 61 | | | | |
| 5 | 0.5 glucose | 15 | 9 | | 75.5 | | | | |
| 6 | | 9 | 12 | | 69 | 10 | | | |
| 7 | 0.5 formaldehyde | 4 | 10 | | 70.5 | | 15 | | |
| 8 | 0.3 pyrogallol | 3 | 15 | | 61.7 | | | 20 | |
| 9 | 0.3 glucose | 2 | 15 | 8 | 64.7 | | | | 10 |
| 10 | 0.1 pyrogallol | 7 | 10 | 30 | 52.9 | | | | |
| 11 | | 5 | | 25 | 70 | | | | |
| 12 | | 10 | | 20 | 70 | | | | |
| 13 | | 10 | | 40 | 50 | | | | |
| 14 | 0.3 glucose | 8 | | 52 | 39.7 | | | | |
| 15 | | 6 | | 50 | 39 | 5 | | | |
| 16 | 0.2 propionaldehyde | 7 | | 35 | 49.8 | | 8 | | |
| 17 | 0.5 valeroaldehyde | 15 | | 15 | 70 | | | | |
| 18 | 0.1 pyrogallol | 6 | | 45 | 38.9 | | | 10 | |
| 19 | 0.3 1,3,5-trihydroxy-benzene | 10 | 15 | 25 | 49.7 | | | | |
| 20 | 0.3 maltose | 5 | | 40 | 39.7 | | | | 15 |

The aforementioned illustrative compositions are not intended to unduly limit the invention, but rather it is intended that all obvious equivalents to such compositions which are described herein or obvious equivalents of solutions described herein are within the scope of the invention.

I claim

1. An aqueous fertilizer solution comprising water, at least one weight percent of ferrous sulfate solute, at least 5 weight percent of a phosphorus solute selected from the class consisting of mono-potassium orthophosphate and mono-ammonium orthophosphate, and a sufficient quantity of mineral acid to impart said solution a pH of between about 1.5 and 4; the concentration of said combined solutes in said solution being (1) less than the salting out concentration at a temperature 20° C. and (2) greater than the additive concentrations of an aqueous solution saturated at 0° C. with said phosphorous solute, combined with an aqueous solution saturated at 0° C. with said ferrous sulfate solute.

2. The solution defined in claim 1 wherein said mineral acid is nitric, sulfuric, or phosphorus acid.

3. The aqueous fertilizer solution of claim 1 wherein said phosphorus solute is mono-ammonium hydrogen orthophosphate.

4. The aqueous fertilizer solution of claim 1 wherein said phosphorus solute is mono-potassium hydrogen orthophosphate.

5. The aqueous fertilizer solution of claim 1 wherein said phosphorus solute is mono-potassium hydrogen orthophosphate and said combined solutes are present at a concentration greater than the saturated concentration of said solutes at 0° C. and less than the saturated concentration of said solutes at 20° C.

6. The aqueous fertilizer solution of claim 1 wherein said phosphorus solute is mono-ammonium hydrogen orthophosphate and said combined solutes are present at a concentration greater than the saturated concentration of said solutes at 0° C. and less than the saturated concentration of said solutes at 20° C.

* * * * *